F. CONNERS.
COMBINATION TOOL.
APPLICATION FILED SEPT. 14, 1916.

1,259,082. Patented Mar. 12, 1918.

Inventor
F. Conners

Witnesses By

Attorneys

UNITED STATES PATENT OFFICE.

FREDERICK CONNERS, OF DOVER, IDAHO.

COMBINATION-TOOL.

1,259,082.　　　　　Specification of Letters Patent.　　Patented Mar. 12, 1918.

Application filed September 14, 1916.　Serial No. 120,128.

*To all whom it may concern:*

Be it known that I, FREDERICK CONNERS, a citizen of the United States, residing at Dover, in the county of Bonner, State of Idaho, have invented a new and useful Combination-Tool; and I do hereby declare the following to be a full, clear, and exact description of the invention, such as will enable others skilled in the art to which it appertains to make and use the same.

This invention relates to an improved combination tool, for instance, a tool that comprises a riveting device, a wire cutter, a punch, a nail extractor and rivet puller, there being spring means for throwing the jaw of the wire cutter open.

One of the objects of the invention is to provide a device of this kind which is simple, efficient and practical in construction, and which may be manufactured at a small expense.

A further object of the invention is to provide means upon the handles of the two hinged members, to prevent the hand of the operator from slipping.

In practical fields, the details of construction may necessitate alterations falling within the scope of what is claimed.

The invention comprises further features and combination of parts, as hereinafter set forth, shown in the drawings, and claimed.

In the drawings:—

Figure 1:
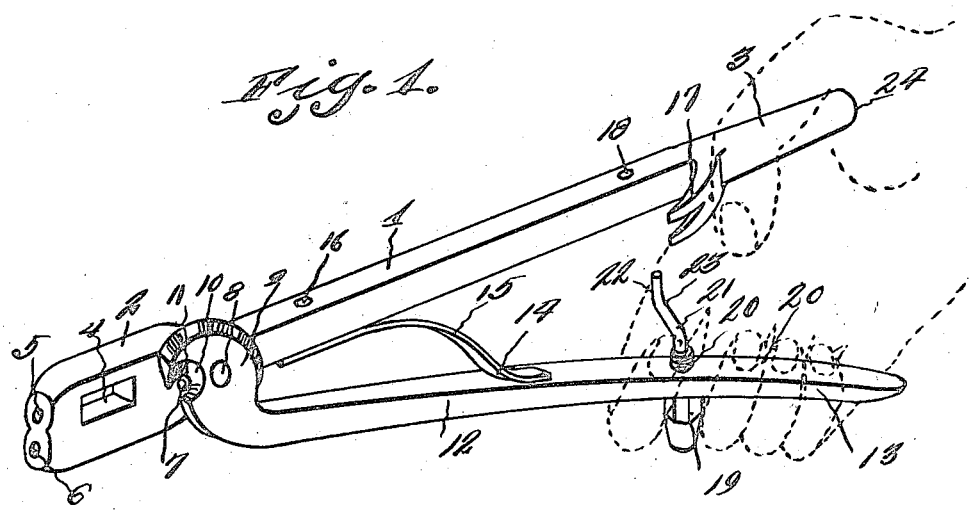
Figure 1 is a view in perspective of the improved combined tool constructed in accordance with the invention.
Figure 3:
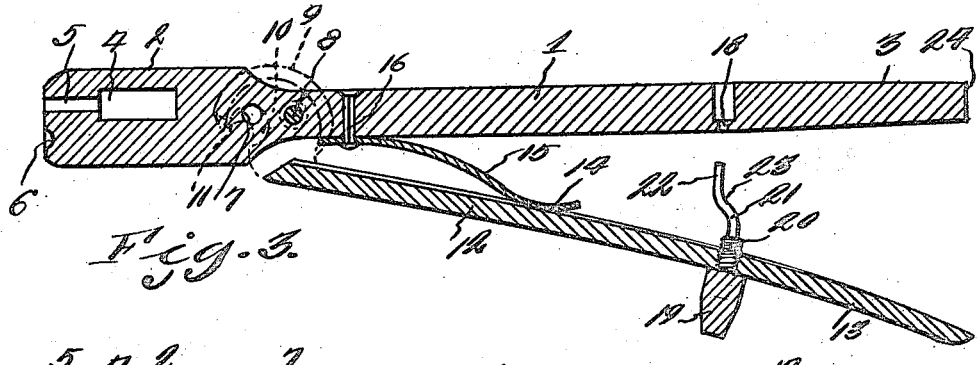
Fig. 3 is a sectional view showing the connection between one of the handle members and the other handle member in dot and dash lines.
Figure 2:
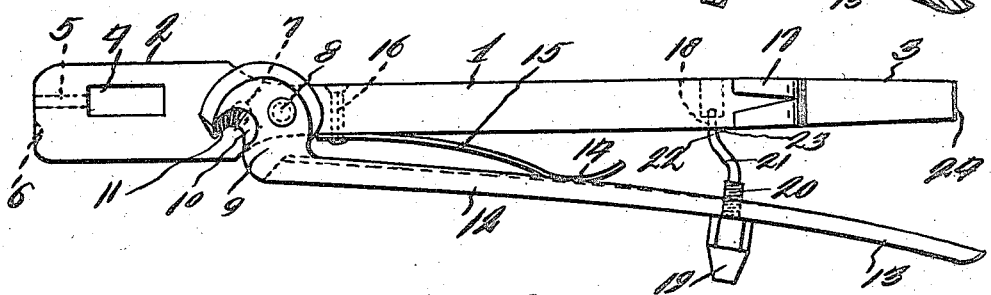
Fig. 2 is a view in side elevation.

Referring more especially to the drawings, 1 designates the shank of a handle member and 2 the head and 3 the handle. The head 2 is provided with a transverse rectangular opening 4, and 5 designates a cylindrical opening at right angles to the opening 4 and communicating therewith. The end face of the head 2 is provided with a spherical depression 6. Adjacent where the shank 1 merges into the head, a cylindrical aperture 7 extends transversely of the head. Pivoted to the shank 1 by means of a riveted pin 8 is a plate 9 provided in its edge with a recess 10 of the shape shown. The wall of the recess 10 is beveled as illustrated, to provide a cutting edge 11, so that when the plate 9 is moved upon its pivot, a cutting edge 11 will play over the opening 7, thereby to sever a piece of wire, nail or the like that may be inserted through the opening 7. The plate 9 is provided with a shank 12, which so projects from the plate 9 as to move in a plane toward and from the shank 1. This shank 12 has a handle portion 13 opposite the handle portion 3, and the inner face of the shank 12 is slightly concaved, so that the end portion 14 of the leaf spring 15 (which is riveted to the shank 1 by means of a rivet 16 rectangular in cross section) may engage therewith in such wise that the edges of the end portion 14 will not extend beyond the opposite side edges of the shank 12. In other words, the concavity of the shank 12 acts as a guide for the leaf spring. The shank 1 is provided with a laterally extending claw 17, for extracting nails or the like, and near the claw the shank 1 is provided with an aperture 18. A hammer abutment 19 is provided, a threaded reduced portion 20 of which is threaded through the shank 12 near the handle 13, and extending from the reduced portion 20 is a second reduced portion 21, the end part 22 of which is offset out of axial alinement with the reduced part 20, so that it will pass through the aperture 18, that is when punching a piece of leather, sheet metal or the like. By pressing the two shanks 1 and 12 toward each other the part 22 will pass through the aperture 18, so that the edge at one end of the aperture will frictionally bind at 23 on the reduced part 21, thereby holding the two shanks toward each other, so that the hammer abutment 19 may be used for driving tacks and the like.

The hammer abutment or poll is designed to be constructed of the best steel, and the reduced part 22, may, if so desired, be casehardened, and the bent part of 22 is designed to be at such an angle so that when it extends through the opening 18, it will not be impaired by its frictional binding.

Since the hammer-poll 19 is merely designed for driving small tacks and the like or deflecting or battery rivet heads, the blows imparted to the hammer-poll or abutment have not been found sufficient to impair the punching member or part 22 to any marked degree, since it has been found through practical experiment that the bent portion will maintain its angle and especially will not deflect the extremity of the part 22, in order to keep it from entering the opening 18.

By virtue of the punch two or more pieces of leather or sheet metal or the like may be punched by hammering on the abutment 19, after which a rivet may be passed through the apertures that are punched, and then the shank of the rivet inserted through the opening 5, so that by hammering upon the extremity 24 of the shank 1 the parts or pieces to be riveted together, may be forced closely against each other. After forcing the parts to be riveted, closely together, the shank of the rivet is engaged by the depression 6, whereby upon again hammering upon the end 24 of the shank 1, the shank of the rivet may be riveted. After cutting one head of the rivet the extracting claw 17 may engage the other head of the rivet for pulling the same. When the two shanks 1 and 12 are being moved toward each other for severing a piece of wire, the hand of the operator, shown in dotted lines, may so grip the shanks 1 and 12, as to enable the thumb to engage the claw 17 and two of the fingers to engage on either side of the hammer abutment, so as to prevent the hand of the operator from slipping.

The invention having been set forth, what is claimed as new and useful is:—

1. In a tool of the kind set forth, the combination of a pair of handle members and means for pivotally uniting said members, of spring means between the two members, one of said handle members having an aperture, the other handle member having a hammer abutment threaded thereto, said abutment having a reduced extension coöperating through said aperture for punching a piece of leather or the like, said reduced extension having a part offset axially from the center of the hammer abutment to bind in said aperture to hold the two handle members closed, said hammer abutment constituting means to be engaged by the fingers of the hand of the operator to insure a firm hold.

2. In a tool of the kind set forth, a pair of handle members pivotally united, spring means between said members, one of said handle members having an aperture consisting of an enlarged part and a restricted part, the other handle member having a leather punching tool, said leather punching tool having an enlargement at one end, a reduced threaded part adjacent the enlargement threaded through the handle member which carries the punching tool, said threaded part having a reduced extension gradually curving in a compound curved manner into a portion offset axially from the center of the threaded part, whereby said offset part may extend through the reduced portion of the aperture for punching leather or the like, and whereby a part of the compound curved portion may bind in the reduced portion of the aperture to hold the two handle members together, so that the enlarged portion of the punching tool may be used as a hammer.

In testimony whereof I have signed my name to this specification in the presence of two subscribing witnesses.

FREDERICK CONNERS.

Witnesses:
  JESSIE LOWRY,
  H. F. WEBSTER.

Copies of this patent may be obtained for five cents each, by addressing the "Commissioner of Patents, Washington, D. C."